United States Patent [19]

Price et al.

[11] Patent Number: 4,549,636
[45] Date of Patent: Oct. 29, 1985

[54] DISC BRAKES FOR VEHICLES

[75] Inventors: Anthony G. Price, Birmingham; Roy E. Edwards, West Midlands, both of England

[73] Assignee: Lucas Industries public limited company, England

[21] Appl. No.: 546,863

[22] Filed: Oct. 31, 1983

[30] Foreign Application Priority Data

Nov. 6, 1982 [GB] United Kingdom ............... 8231769

[51] Int. Cl.$^4$ ............................................. F16D 55/18
[52] U.S. Cl. ................................ 188/71.4; 188/72.2; 188/72.6; 188/106 F
[58] Field of Search ................. 188/18 A, 70 B, 71.4, 188/71.5, 72.2, 72.6, 72.7, 72.8, 73.2, 73.31, 73.39, 206 R, 206 A, 106 F; 92/108, 113, 114, 115, 129; 192/70, 83, 93 A

[56] References Cited

U.S. PATENT DOCUMENTS

| | | | |
|---|---|---|---|
| 4,089,392 | 5/1978 | Ostrowski | 188/71.4 |
| 4,235,310 | 11/1980 | Kibler et al. | 188/72.7 X |
| 4,363,382 | 12/1982 | Anderson | 188/72.6 X |
| 4,508,198 | 4/1985 | Gornall et al. | 188/71.4 |

FOREIGN PATENT DOCUMENTS 1277345  6/1972  United Kingdom .

*Primary Examiner*—Bruce H. Stoner, Jr.
*Assistant Examiner*—Richard R. Diefendorf
*Attorney, Agent, or Firm*—Harness, Dickey & Pierce

[57] ABSTRACT

In a spreading disc brake, actuating movement of an actuator assembly in a stationary housing can be effected hydraulically by a piston working in a cylinder and acting on a pull-rod through a rocking thrust coupling, and the pull-rod is adapted for connection to a hand-lever in order to apply the brake manually or mechanically. The thrust coupling is provided at an intermediate point in the length of a lever, a first pivotal connection is provided between the pull-rod and an intermediate point in the length of the lever, a second pivotal connection is provided between one end of the lever and the housing, and a third pivotal connection is provided between the opposite end of the lever and a transmission member for connection to the hand-lever.

8 Claims, 6 Drawing Figures

DISC BRAKES FOR VEHICLES

SPECIFIC DESCRIPTION

This invention relates to disc brakes for vehicles of the kind in which at least one friction disc rotatable within a stationary housing is adapted to be moved into engagement with a relatively stationary surface, and actuating means are provided for moving the disc into engagement with the said surface to apply the brake, the actuating means comprising at least one pressure plate which is located in the housing adjacent to the disc, and balls housed in recesses in the pressure plate and an adjacent face of a reaction member, actuating movement of the pressure place relative to the reacting member in the plane of the pressure plate being accompanied by axial movement of the pressure plate to urge the friction disc into engagement with the stationary surface. The actuating movement of the pressure plate can be effected hydraulically by an actuator comprising a cylinder and piston assembly of which the axis is substantially normal to that of the brake and of which one component is fixed relative to the housing and the other is movable and acts through a so-called rocking thrust coupling associated with a pull-rod passing through the actuator with a substantial clearance, and the pull-rod is adapted for connection to a manually-operable brake applying device, a hand lever for example.

A brake of that kind is referred to below as "a brake of the kind set forth" and is particularly suitable for use in tractors and the like.

In known brakes of the kind set forth the pull-rod itself is extended in length for a substantial distance beyond the coupling and the outer end of the extended portion is coupled to the manually-operable brake applying device.

According to our invention in a disc brake of the kind set forth a rocking thrust coupling is provided at an intermediate point in the length of a lever, a first pivotal connection is provided between the pull-rod and an intermediate point in the length of the lever, a second pivotal connection is provided between one end of the lever and the stationary housing, and a third pivotal connection is provided between the opposite end of the lever and a transmission member for connection to the manually-operable brake-applying device.

When the brake is applied hydraulically the brake-applying force is transmitted to the pull-rod through the portion of the lever which is disposed between the thrust coupling and the first pivotal connection, and when the brake is applied mechanically the lever acts as lever of the third order with the lever pivoting about the second pivotal connection as a fulcrum.

Providing the lever reduces the mechanical brake-applying effort required to produce a given brake-applying force and enables us to reduce the strength of the transmission member. For example the transmission member may comprise a flexible inextensible member, for example a cable, rather than a rigid rod.

The second and third pivotal connections may include lost-motion couplings so that movement of the lever when the brake is applied hydraulically is not transmitted to the manually-operable brake-applying device.

Some embodiments of our invention are illustrated in the accompanying drawings in which.

Figure 1:
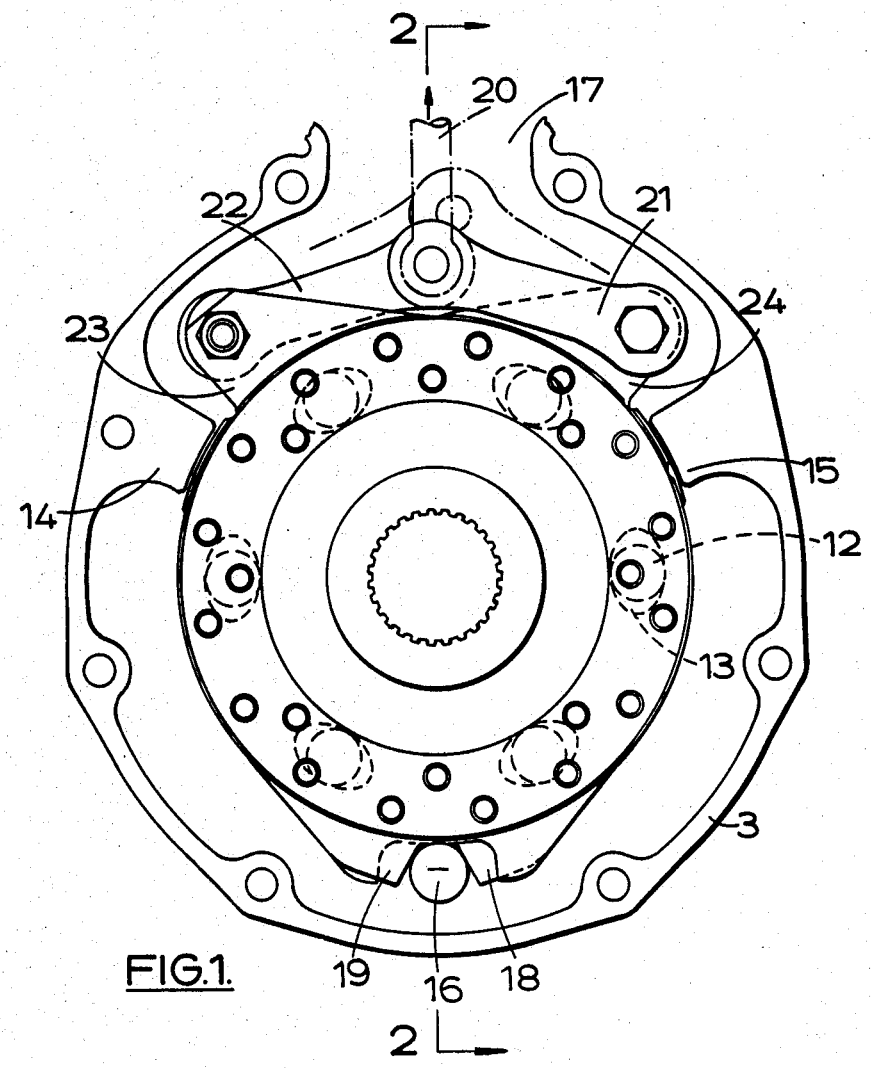
FIG. 1 is an end view of a spreading brake.
Figure 2:
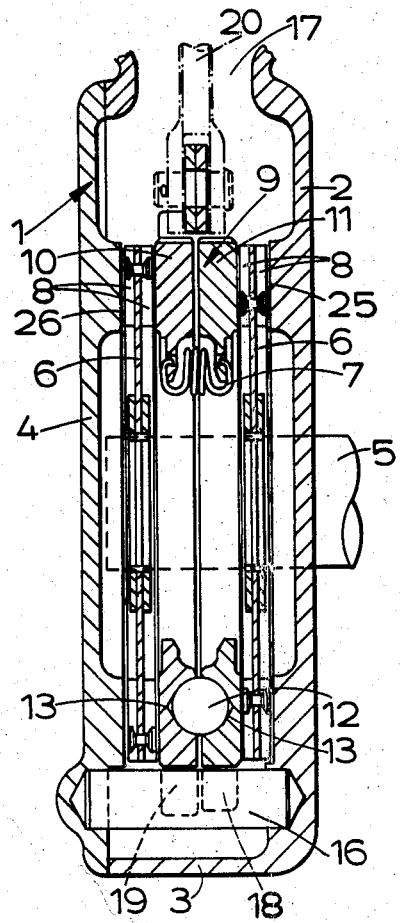
FIG. 2 is a section on the line 2—2 of FIG. 1.

The spreading disc brake illustrated in FIGS. 1 and 2 of the drawings comprises a stationary housing 1 mounted on a vehicle. The housing 1 comprises a casing 2 having a radial flange 3 at its peripheral edge, and a removable cover plate 4 abutting against the free end of the flange 3.

A shaft 5 to be braked projects through the casing 2 into the housing. A pair of discs 6 are splined on the shaft 5 and each disc 6 is provided on opposite faces with lining rings 8 of friction material.

An actuator assembly 9 for applying the brake is located in the housing 1. As illustrated the actuator assembly 9 comprises a pair of pressure plates 10, 11, comprising annular rings, and balls 12 housed in pairs of complementary recesses 13 in adjacent faces of the two plates 10, 11. The plates 10, 11 are centered on three angularly spaced pilots 14, 15, 16 in the housing of which the pilots 14, 15 comprise lugs which extend radially from the flange 3 and are displaced angularly by equal distances from a radial opening 17 in the flange 3, and the pilot 16 comprises a torque or anchor pin which is received at opposite ends in end walls defined by the casing 3 and the cover plate 4, at a location immediately opposite the opening 17. Tension return springs 7 urge the pressure plates 10 and 11 towards each other.

Each pressure plate 10, 11 is provided with a radial lug 18, 19 respectively, and each lug 18, 19 has a radial notch in it in which the pin 16 is received and which is of a circumferential length considerably greater than the diameter of the pin 16. Faces in the lugs 18, 19 at opposite ends of the notches act as torque transmitting faces for engagement with the pin 16 when the brake is applied, depending upon the direction of rotation of the shaft 5.

At their ends adjacent to the opening 17 the plates 10 and 11 are coupled to a actuating pull-rod 20 which is coupled to the inner ends of a pair of toggle links 21, 22 of which the inner ends are pivotally connected to lugs 23, 24 on respective pressure plates 10, 11.

To apply the brake with the shaft 5 and the discs 6 rotating, the pull-rod 20 is withdrawn relatively from the housing 1 with that movement transmitted to the plates 10, 11 through the toggle links 21 and 22 to cause relative rotation of the pressure plates 10, 11. Due to the presence of the balls 12, such angular movement is accompanied by separating movement of the pressure plates 10, 11 in a direction relatively away from each other, and against the force in the springs 7, by the camming tendency for the balls 12 to ride up ramps defined by end faces of the recesses 13, and the plates 10, 11 engage with the discs 6 to urge them into engagement with braking surfaces 25 and 26 comprising the inner faces of the casing 2 and the end plate 4. The plates 10, 11 are carried round with the discs 6 until movement of one of the plates is arrested by the engagement of its lug 18 or 19 with the pin 16. The other plate, known as the energising or servo plate, continues to rotate with the discs, thereby increasing the camming effect of the balls 12 to enhance the friction grip of the brake.

Figure 3:
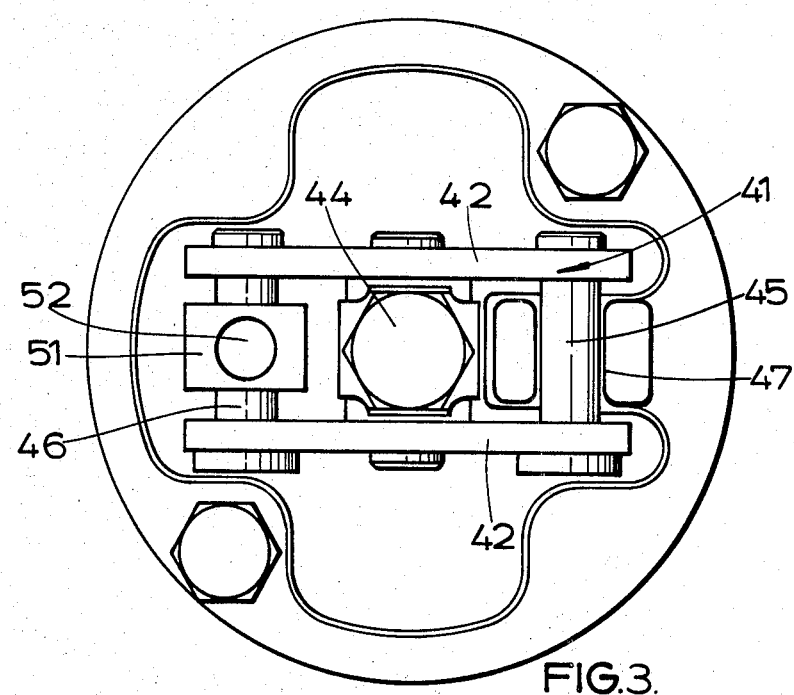
FIG. 3 is a plan view of a brake-applying mechanism with a flexible sealing boot omitted for clarity.
Figure 4:
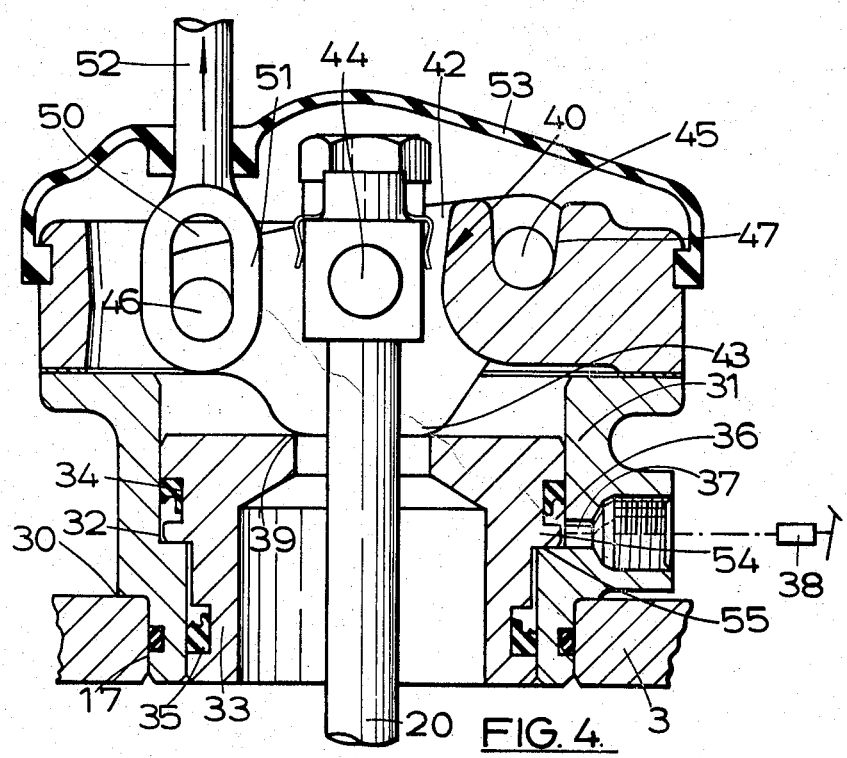
FIG. 4 is a longitudinal section through the mechanism.

The pull-rod 20 is adapted to be withdrawn from the housing 1 by the mechanism illustrated in FIGS. 3 and 4 of the drawings in which the opening 17 is adapted in its periphery to provide a seating 30 for an hydraulic cylinder 31 which is secured to the housing 1 and is open at both ends.

The axis of the cylinder 31 is substantially at right angles to that of the brake.

The cylinder 31 has a stepped bore 32 in which works a hollow annular stepped piston 33 sealed by seals 34 and 35. The working space of the cylinder is the annular space 36 around the piston 33 at the step in diameter and a connection 37 is made to this space from a master cylinder 38 or other source of fluid under pressure.

The outer end of the piston 33 is adapted to define a thrust transmitting portion 39 which acts through a force transmitting assembly 40 to transmit a brake-applying force from the piston 33 to the pull-rod 20 for moving the pressure plates 9 and 10 of the brake in a brake-applying direction.

The force-transmitting assembly 40 comprises a lever assembly 41 in the form of two spaced parallel members 42 of substantial depth, each of which is formed on an edge adjacent to the brake with a radiused nose 43. The noses have rocking engagements with the thrust-transmitting portion 39 to define a part-circular rocking coupling. A trunnion mounted block 44 is pivotally connected between the members 42 at intermediate points in their lengths and in which the outer end of the pull-rod 20 is rigidly received.

The members 42 are also interconnected at opposite ends by transverse pivot pins 45 and 46. The pivot pin 45 is received in slot 47 in a portion of the cylinder 31 which is straddled by the members and of which its open outer end faces outwardly away from that end of the housing 1, and the pivot pin 46 is received within an elongate slot 50 in a fitting 51 at the free end of a transmission member 52, suitably a flexible cable which leads to a hand brake-applying lever.

The outer end of the cylinder 31 remote from the brake is closed by a flexible sealing boot 53. This has the advantage that when the brake is of the oil-immersed type, the oil from the brake can enter the mechanism to provide lubrication for the relatively movable parts and, in particular, for the trunnion 44 and the pivot pins 45 and 46.

In the inoperative retracted position shown in the drawings a shoulder 54 at a step of the change in diameter of the piston 33 engages with a complementary shoulder 55 in the cylinder 33.

When the brake is to be applied hydraulically for normal service braking, hydraulic fluid under pressure is introduced into the annular space 36 to urge the piston 33 and the lever assembly 41 bodily in an outwards direction with respect to the cylinder 31. This transmits a thrust to the trunnion 44 through the nose 43 and the portion of the lever assembly 41 between the nose 43 and the trunnion 44, in turn, applying a tensile force to the pull-rod 20 which moves in unison with the piston 33 to move the pressure plates 10 and 11 in the brake-applying direction.

During the bodily movement of the lever assembly 41, the pins 45 and 46 ride up the slots 47 and 50 so that no movement of the piston 33 is transmitted to the hand brake-applying lever. Any circumferential movement of the trunnion 44 when the brake is applied can be accomodated by the nose 43 sliding with respect to the thrust-transmitting portion 39 of the piston 33, with angular movement of the lever assembly 41 being accommodated by the trunnion 44 pivoting in the lever assembly 41.

When the brake is released, the pressure plates 10 and 11 are urged towards each other by the springs 7 which, in turn, determines the degree to which the piston 33 is retracted and returned towards its fully retracted position with the shoulders 54 and 55 in engagement.

When the brake is to be applied mechanically or manually, for parking or in an emergency, the handbrake applying lever is operated to apply a tension to the transmission member 52. This, in turn, applies an effort to one end of the lever assembly 41, which acts as a lever of the third order, and pivots about a fulcrum defined by the engagement of the pin 45 with the base of the slot 47, the rod 20 being relatively withdrawn from the housing 1 with the nose 31 moving away from the piston 33.

When the brake is released the lever assembly 41 is returned to a retracted position defined by its engagement with the piston 33.

As the friction linings 8 wear it will be necessary to reduce the effective length of the transmission member 52 in order to take-up any lost-motion in the transmission between the lever assembly 41 and the brake-applying lever and hold the braking clearances at a desired level with the pressure plates 10 and 11 displaced angularly so that the balls 12 are at least partially held up the ramps. This can be achieved by a suitable nut and threaded connection in the transmission.

Figure 5:
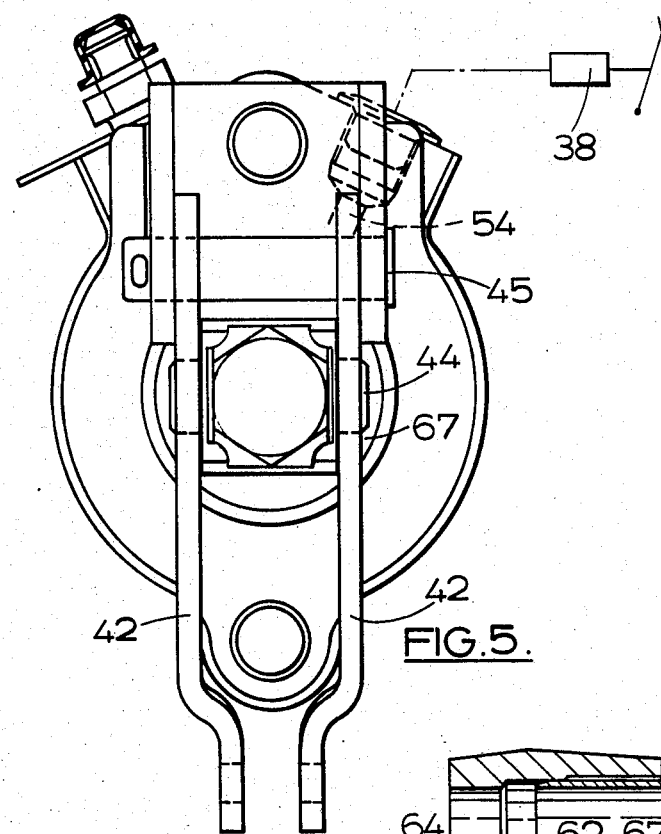
FIG. 5 is a plan of another brake-applying mechanism.
Figure 6:
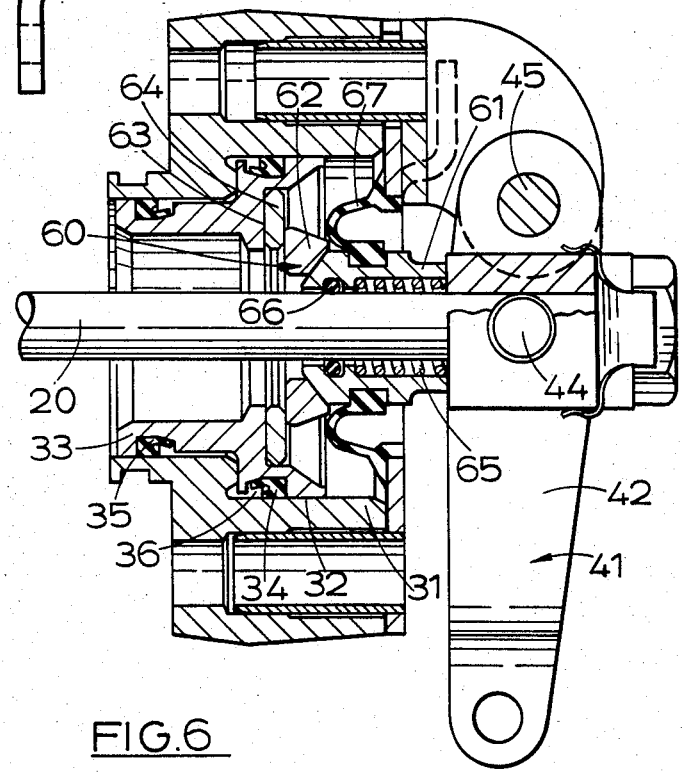
FIG. 6 is a longitudinal section through the mechanism of FIG. 5.

In the mechanism illustrated in FIGS. 5 and 6 the boot 53 is omitted and the members 42 comprising the lever assembly 41 are reduced in thickness to omit the noses 43. A thrust assembly 60 is interposed between the trunnion mounted block 44 and the piston 33.

The thrust assembly 60 comprises a cylindrical member 61 through which the pull-rod 20 extends into the housing 1, and which co-operates at opposite ends between the block 44 and a collar 62, and the collar 62, in turn, acts on an annular thrust receiving face 63 at the adjacent end of the piston 33, through a thrust-transmitting washer 64 of low friction material. The washer 64 is received in a recess in the piston 33, in which it is retained against relative movement in the radial direction. The co-operating faces of the member 61 and the annular collar 62 are of part-spherical outline to define a part-spherical rocking thrust coupling, and a compression spring 65 acts between the block 44 and a shoulder on the member 61 to urge the member 61 relatively towards the brake in order normally to maintain inter-engaging faces in contact to avoid rattle and the relative displacement of the components in a radial direction in the inoperative position of brake, or when the brake is applied mechanically or manually.

An 'O' ring seal 66 housed in a radial groove in the member 61 seals against the pull-rod 20, and a sealing boot 67 provides a seal between the external surface of the member 61 and the cylinder 31.

When the brake is to be applied hydraulically for normal service braking, movement of the piston 33 in an outwards direction transmits a thrust to the trunnion 44 through the washer 64, the collar 62, and the member 61, moving the lever assembly 41 angularly about the pin 45 and, in turn, applying a tensile force to the pull-rod 20.

Any circumferential movement of the block 44 when the brake is applied can be accommodated by the member 61 rocking with respect to the collar 62, and by the collar 62 sliding with respect to the washer 64 in a radial direction, with angular movement of the lever assembly 41 being accomodated by the trunnion 44 pivoting in the lever assembly 41.

when the brake is to be applied mechanically or manually, the hand-brake applying lever is operated to apply a tension to the transmission member 52 which is coupled to the end of the lever assembly 41 remote from the pin 45. This, in turn, applies an effort to one end of the lever assembly 41, and pivots about a fulcurm defined by the pin 45. The trunnion block 44 separates from the member 61 due to the force in the spring 65, with the rod 20 sliding through the seal 66.

The construction and operation of the mechanism of FIGS. 5 and 6 is otherwise the same as that of FIGS. 3 and 4, and corresponding reference numerals have been applied to corresponding parts.

We claim:

1. A disc brake for a vehicle comprising a stationary housing, a braking surface in said housing, a disc rotatable in said housing and movable into engagement with said braking surface, actuating means in said housing for moving said disc into engagement with said surface to apply the brake, said actuating means comprising at least one pressure plate located in said housing adjacent to said disc, a reaction member, recesses in adjacent faces of the pressure plate and said reaction member, and balls housed in said recesses, actuating movement of said pressure plate relative to said reaction member in the plane of said pressure plate being accompanied by axial movement of said pressure plate to urge said friction disc into engagement with the braking surface, an actuator for effecting actuating movement of said pressure plate, said actuator comprising an hydraulic cylinder and piston assembly of which the axis is substantially normal to that of said brake and of which one component is fixed relative to said housing and the other is movable, a pull-rod, a rocking thrust coupling through which said movable component acts on said pull-rod, said pull-rod passing through said cylinder and piston assembly with a substantial clearance, and said pull-rod being adapted for connection to a manually-operable brake applying device, a lever having first and second opposite ends, and a transmission member for connection to said manually-operable brake-applying devices, wherein said rocking thrust coupling is provided at an intermediate point in the length of said lever, a first pivotal connection is provided between said pull-rod and an intermediate point in the length of said lever, a second pivotal connection is provided between said first end of said lever and said stationary housing, and a third pivotal connection is provided between said second end of said lever and said transmission member, said second and third pivotal connections include lost-motion couplings so constructed and arranged that movement of said lever when the brake is applied hydraulically is not transmitted to said manually-operable brake-applying device.

2. A disc brake as claimed in claim 1, wherein a part-circular nose portion is provided on said lever and a part-circular thrust face is provided on said piston, said rocking thrust coupling being defined by a rocking engagement between said nose portion and said thrust face.

3. A disc brake as claimed in claim 2, wherein said lever comprises an assembly of two spaced parallel members which straddle said pull-rod, and each said parallel member has a part-circular nose portion for engagement with the co-operating face on said piston.

4. A disc brake as claimed in claim 3, wherein a transmission block is pivotally connected between said two parallel members of said lever assembly, and said lever assembly acts on said pull-rod through said transmission block.

5. A disc brake for a vehicle comprising a stationary housing, a braking surface in said housing, a disc rotatable in said housing and movable into engagement with said braking surface, actuating means in said housing for moving said disc into engagement with said surface to apply the brake, said actuating means comprising at least one pressure plate located in said housing adjacent to said disc, a reaction member, recesses in adjacent faces of the pressure plate and said reaction member, and balls housed in said recesses, actuating movement of said pressure plate relative to said reaction member in the plane of said pressure plate being accompanied by axial movement of said pressure plate to urge said friction disc into engagement with the braking surface, an actuator for effecting actuating movement of said pressure plate, said actuator comprising an hydraulic cylinder and piston assembly of which the axis is substantially normal to that of said brake and of which one component is fixed relative to said housing and the other is movable, a pull-rod, a rocking thrust coupling, defined between two components of a thrust assembly, through which said movable component acts on said pull-rod, said pull-rod passing through said cylinder and piston assembly with a substantial clearance, and said pull-rod being adapted for connection to a manually-operable brake applying device, a force from said piston being transmitted to said pull-rod through said thrust assembly, a lever having first and second opposite ends, and a transmission member for connection to said manually-operable brake-applying device, wherein said rocking thrust coupling is provided at an intermediate point in the length of said lever, a first pivotal connection is provided between said pull-rod and an intermediate point in the length of said lever, a second pivotal connection is provided between said first end of said lever and said stationary housing, and a third pivotal connection is provided between said second end of said lever and said transmission member, said thrust assembly comprising a tubular member through which said pull-rod extends, and an annular collar for co-operation with said piston; said tubular member having a first end co-operating with said pull-rod, a second end of part-spherical outline, with an abutment face and carries a biasing member that acts between said lever and said abutment face continually to bias said tubular member into engagement with said collar, said collar having a recess which is of an outline complementary to that of said second end of said tubular member and in which said second end of said tubular member is received.

6. A disc brake as claimed in claim 5, wherein a thrust washer of low-friction material is interposed between said collar and said piston.

7. A disc brake as claimed in claim 5, in which said lever comprises an assembly of two spaced parallel members which straddle said pull-rod.

8. A disc brake as claimed in claim 7, wherein a trunnion mounted block is pivotally connected between said two members of said lever assembly, and said lever assembly acts on said pull-rod through said trunnion block.

* * * * *